US012518739B2

(12) United States Patent
Xia

(10) Patent No.: US 12,518,739 B2
(45) Date of Patent: Jan. 6, 2026

(54) METHOD, APPARATUS, AND SYSTEM FOR IMPLEMENTING SIMULTANEOUS INTERPRETATION

(71) Applicant: Huawei Cloud Computing Technologies Co., Ltd., Guizhou (CN)

(72) Inventor: Yu Xia, Suzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 261 days.

(21) Appl. No.: 18/333,877

(22) Filed: Jun. 13, 2023

(65) Prior Publication Data
US 2023/0326448 A1 Oct. 12, 2023

Related U.S. Application Data

(63) Continuation of application No. PCT/CN2021/138353, filed on Dec. 15, 2021.

(30) Foreign Application Priority Data

Dec. 15, 2020 (CN) .......................... 202011481105.5

(51) Int. Cl.
G10L 15/26 (2006.01)
G10L 15/00 (2013.01)
G10L 15/22 (2006.01)
G10L 15/28 (2013.01)

(52) U.S. Cl.
CPC ............ *G10L 15/005* (2013.01); *G10L 15/22* (2013.01); *G10L 15/26* (2013.01); *G10L 15/28* (2013.01)

(58) Field of Classification Search
CPC ........ G06F 40/58; G06F 40/263; G06F 40/35; G10L 15/26
See application file for complete search history.

(56) References Cited

U.S. PATENT DOCUMENTS

| | | | | |
|---|---|---|---|---|
| 8,279,861 | B2* | 10/2012 | Chao-Suren | G06F 40/58 704/277 |
| 9,542,486 | B2* | 1/2017 | Cuthbert | G06F 16/683 |
| 10,719,291 | B2* | 7/2020 | Kozlov | G06F 3/165 |
| 10,817,678 | B2* | 10/2020 | Lewis | G06F 40/58 |
| 11,068,669 | B2* | 7/2021 | Malcangio | G06F 9/454 |
| 12,198,689 | B1* | 1/2025 | Whitenack | G10L 15/16 |
| 2011/0246172 | A1* | 10/2011 | Liberman | H04M 3/56 348/14.09 |
| 2013/0238311 | A1* | 9/2013 | Lou | G06F 40/58 704/3 |
| 2020/0043495 | A1* | 2/2020 | Park | G10L 15/25 |

(Continued)

FOREIGN PATENT DOCUMENTS

| | | |
|---|---|---|
| CN | 108650484 A | 10/2018 |
| CN | 208675397 U | 3/2019 |

(Continued)

*Primary Examiner* — Daniel Abebe
(74) *Attorney, Agent, or Firm* — Conley Rose, P.C.

(57) ABSTRACT

A media server receives an audio stream of a conference speaker and an audio stream interpreted based on the audio stream, sends the interpreted audio stream to an artificial intelligence (AI) device to identify a language of the interpreted audio stream, and forwards the interpreted audio stream to a corresponding terminal based on an identification result.

20 Claims, 7 Drawing Sheets

(56) References Cited

U.S. PATENT DOCUMENTS

2020/0193966 A1* 6/2020 Chakravarthy ......... G06F 40/56
2022/0189457 A1* 6/2022 Shen ....................... G10L 15/16
2024/0221721 A1* 7/2024 Hiray .................... G06F 40/263
2025/0045536 A1* 2/2025 Bennett ............... G10L 15/1822

FOREIGN PATENT DOCUMENTS

JP        2018037806 A  *  3/2018
JP        2021086264 A  *  6/2021
WO    WO-2021248032 A1 * 12/2021

* cited by examiner

METHOD, APPARATUS, AND SYSTEM FOR IMPLEMENTING SIMULTANEOUS INTERPRETATION

CROSS-REFERENCE TO RELATED APPLICATIONS

This is a continuation of International Patent Application No. PCT/CN2021/138353 filed on Dec. 15, 2021, which claims priority to Chinese Patent Application No. 202011481105.5 filed on Dec. 15, 2020. The disclosures of the aforementioned applications are hereby incorporated by reference in their entireties.

TECHNICAL FIELD

This disclosure relates to the field of conference communication, and in particular, to a method, an apparatus, and a system for implementing simultaneous interpretation.

BACKGROUND

With the acceleration of globalization, a quantity of international conferences increases markedly. The diversity of languages in various countries also creates a requirement for simultaneous interpretation during a conference. Simultaneous interpretation is an interpretation manner in which an interpreter continuously interprets content to audiences without interrupting a speaker's speech. A large seminar or international conference usually requires two or three interpreters to perform simultaneous interpretation alternately.

In an actual application scenario, a speaker in one conference constantly changes, and speakers from different countries may use different types of languages. Therefore, an interpreter also needs to adjust an output interpretation language as the speaker changes. For example, if work content of an interpreter is bidirectional interpretation between Chinese and English, when a speaker changes and a speaking language changes from Chinese to English, the interpreter will also switch from Chinese-English interpretation to English-Chinese interpretation. In addition, when changing an output language, the interpreter needs to manually change the output language from English to Chinese on a related device, so that a machine can send an interpreted audio stream to audiences of the same language. In addition, a dedicated conference administrator also needs to be assigned on a conference site to set a language of a current speaker, so that a media server can identify the language of the current speaker and return an interpreted audio stream to a large-screen terminal on the conference site.

However, such an operation manner is error-prone. For an interpreter in a high-strength assignment, the interpreter needs to set a new output language on the related device while switching an output language of the interpreter. This may cause omissions and finally result in abnormal effects. The conference administrator needs to focus on speaking language switching, and identifies a language of the speaker. If the language switching is not performed in time or is incorrect, confusion may also be caused. In general, such a manner is difficult in operation, and brings poor user experience.

SUMMARY

This disclosure provides a method, an apparatus, and a system for implementing simultaneous interpretation, so as to reduce a degree of manual participation in simultaneous interpretation, and improve efficiency of conference simultaneous interpretation.

According to a first aspect, this disclosure provides a method for implementing simultaneous interpretation. A media server receives a first audio stream and a second audio stream interpreted based on the first audio stream. Then the media server sends the second audio stream to an artificial intelligence (AI) device to identify a language of the second audio stream. The media server sends the second audio stream to a first terminal based on the language of the second audio stream, where the language of the second audio stream is a language of an audio stream that the first terminal expects to receive. The media server uses the AI device to identify a language of an interpreted audio stream (the second audio stream), so that an interpreter does not need to manually set an interpreted language through an interpretation terminal, thereby reducing pressure of the interpreter, reducing an error rate of a conference language system, and improving efficiency of simultaneous interpretation.

In a possible implementation, the media server sends the first audio stream to the AI device to identify a language of the first audio stream. Then the media server sends the first audio stream to a second terminal based on the language of the first audio stream, where the language of the first audio stream is a language of an audio stream that the second terminal expects to receive. The media service uses the AI device to identify a language of an original audio stream (the first audio stream) of a speaker, so that a conference administrator does not need to manually set a language of the speaker through a conference room terminal, thereby reducing manual participation in an entire simultaneous interpretation process, and improving efficiency of simultaneous interpretation.

In another possible implementation, the media server determines the language of the second audio stream based on a language identification result that is of the second audio stream and that is returned by the AI device. In this implementation, the AI device directly returns the language identification result. The media server does not need to perform any processing on the result, and then forwards the second audio stream to the first terminal based on the language identification result.

In another possible implementation, the media server receives text corresponding to the second audio stream and returned by the AI device, and then determines the language of the second audio stream based on the text. The AI device converts an audio stream into text and sends the text to the media server. The media server determines the language of the second audio stream based on the text. In this implementation, after receiving the text returned by the AI device, the media server may further forward the text to a corresponding terminal based on a setting of each terminal, so as to implement a real-time subtitle.

In another possible implementation, the media server sends the first audio stream to interpretation terminals used by all interpreters, and then receives the second audio stream, where the second audio stream is one of audio streams returned by all the interpretation terminals. In this implementation, when sending an original audio stream of a speaker to an interpreter, the media server adopts a policy of sending the original audio stream of the speaker to each interpreter, and does not need to consider an interpretation capability of the interpreter, thereby reducing occupation of computing resources of the media server and reducing an error rate of simultaneous interpretation.

In another possible implementation, the language of the first audio stream is a first language, and the language of the second audio stream is a second language. The media server sends the first audio stream to a third terminal based on a language identification result that is of the first audio stream and that is returned by the AI device and a first interpretation capability parameter. The first interpretation capability parameter indicates that an interpretation capability of a first interpreter that uses the third terminal includes interpreting the first language into the second language. Then, the media server receives the second audio stream sent by the third terminal. In this implementation, when forwarding an original audio stream of a speaker to an interpreter, the media server considers an interpretation capability of the interpreter. To be specific, the original audio stream is only forwarded to an interpreter related to a related service of the language of the first audio stream, thereby reducing transmission of redundant information and reducing occupation of network transmission resources.

In another possible implementation, the media server receives the first interpretation capability parameter sent by the third terminal. The first interpreter feeds back an interpretation capability parameter of the first interpreter to the media server through the third terminal, for example, bidirectional interpretation between Chinese and English, and bidirectional interpretation between English and French.

In another possible implementation, the media server specifies an interpretation capability parameter corresponding to the third terminal before a conference starts, and an interpreter selects, based on an interpretation capability of the interpreter, the third terminal to receive an original audio stream of a speaker and send an interpreted audio stream.

In another possible implementation, the language of the first audio stream is a first language, the language of the second audio stream is a second language. The media server determines a fourth terminal and a fifth terminal based on a language identification result that is of the first audio stream and that is returned by the AI device, a second interpretation capability parameter, and a third interpretation capability parameter. The second interpretation capability parameter indicates that an interpretation capability of a second interpreter that uses the fourth terminal includes interpreting the first language into a third language. The third interpretation capability parameter indicates that an interpretation capability of a third interpreter that uses the fifth terminal includes interpreting the third language into the second language. The media server sends the first audio stream to the fourth terminal. The media server receives a third audio stream sent by the fourth terminal, where a language of the third audio stream is the third language. The media server sends the third audio stream to the fifth terminal. The media server receives the second audio stream sent by the fifth terminal. The media server determines an interpretation relay policy based on the language identification result of the first audio stream and interpretation capability parameter information of each interpreter, so as to ensure normal running of a conference interpretation service.

In another possible implementation, before the media server sends the second audio stream to the first terminal, the media server further stores the second audio stream. After a determined moment, the media server starts to send the second audio stream to the first terminal from the second audio stream stored before the determined moment. The determined moment is a moment at which the media service determines that the language of the second audio stream is the language that the first terminal expects to receive. Before the second audio stream is sent to the first terminal, the second audio stream is buffered, and is forwarded after language information is determined, thereby reducing a probability of crosstalk in a conference and improving user experience.

In another possible implementation, the media server receives first language setting information sent by the first terminal, where the first language setting information indicates the language of an audio stream that first terminal expects to receive. The media server receives second language setting information sent by the second terminal, where the second language setting information indicates the language of an audio stream that the second terminal expects to receive. The media server determines, based on language setting information of each terminal, a language of an audio stream that each terminal expects to receive.

In another possible implementation, the AI device and the media server are deployed in a same server. When the AI device and the media server are deployed in the same server, a communication delay between the AI device and the media server is reduced, and influence of a network on a simultaneous interpretation service is reduced.

Based on the foregoing descriptions, in the simultaneous interpretation method provided in this disclosure, language identification is performed on each audio stream through an AI device to implement an efficient conference simultaneous interpretation service. The conference administrator does not need to manually change the language of the current speaker through a conference terminal when the speaker changes the language, thereby reducing manual participation in a simultaneous interpretation process. The interpreter also does not need to set, through an interpretation terminal, a language to be outputted by the interpreter before interpretation is performed, thereby alleviating working pressure of the interpreter and reducing a probability of a language error during a conference. In general, the simultaneous interpretation method alleviates pressure of staff and improves efficiency of conference simultaneous interpretation.

According to a second aspect, this disclosure provides an apparatus for implementing simultaneous interpretation. The apparatus includes each module configured to perform the method for implementing simultaneous interpretation according to the first aspect or any possible implementation of the first aspect.

According to a third aspect, this disclosure provides a system for implementing simultaneous interpretation. The system includes a media server and an AI device. The media server is configured to receive a first audio stream and a second audio stream, where the second audio stream is an audio stream interpreted based on the first audio stream; and is further configured to send the second audio stream to the AI device. The AI device is configured to receive the second audio stream, and send first language identification information to the media server. The media server is further configured to determine a language of the second audio stream based on the first language identification information, and send the second audio stream to a first terminal.

In another possible design, the media server is further configured to send the first audio stream to the AI device. The AI device is further configured to receive the first audio stream, and send second language identification information to the media server. The media server is further configured to determine the language of the second audio stream based on the second language identification information, and send the second audio stream to the first terminal.

In another possible design, the first language identification information includes a language identification result of the first audio stream or text corresponding to the first audio stream.

For a technical effect that can be achieved by any possible design of the third aspect, refer to the technical effect that can be achieved by the first aspect. Details are not described herein again.

According to a fourth aspect, this disclosure provides a simultaneous interpretation device, where the simultaneous interpretation device includes a processor, a memory, a communication interface, and a bus. The processor, the memory, and the communication interface are connected and communicate with each other through the bus. The memory is configured to store computer-executable instructions. When the simultaneous interpretation device runs, the processor executes the computer-executable instructions in the memory, to perform, by using hardware resources in the device, the operation steps performed by the media server in the method according to the first aspect or any possible implementation of the first aspect.

According to a fifth aspect, this disclosure provides a computer-readable storage medium. The computer-readable storage medium stores instructions. When the instructions are run on a computer, the computer is enabled to perform the method according to the first aspect.

According to a sixth aspect, this disclosure provides a computer program product including instructions. When the instructions are run on a computer, the computer is enabled to perform the method according to the first aspect.

In this disclosure, based on implementations provided in the foregoing aspects, more implementations may be provided through further combination.

DESCRIPTION OF EMBODIMENTS

To improve readability of this disclosure, before embodiments provided in this disclosure are described, some terms are first explained.

Multimedia control unit (MCU): a media processing server based on a centralized architecture. The multimedia control unit may perform operations such as decoding, mixing, and encoding on audio and video streams. The multimedia control unit is configured to access a plurality of terminals to perform multipoint audio and video communication.

Selective forwarding unit (SFU): a media processing server based on a centralized architecture. The selective forwarding unit only forwards audio and video streams, and does not perform operations such as decoding, mixing, and encoding on the streams. The selective forwarding unit is configured to access a plurality of terminals to perform multipoint audio and video communication.

Pulse-code modulation (PCM): one coding scheme of digital communication. A main process is to sample an analog signal such as a voice analog signal or an image analog signal at intervals to discretize the analog signal, round and quantize a sample value based on a hierarchical unit, and convert the sample value to a group of binary code to represent an amplitude value of a sampling pulse. In a conference system, usually, a sound receiving device such as a microphone first collects voice of a speaker to form an analog signal. Then a conference terminal encodes the analog signal into a PCM digital stream, encodes the PCM stream into an audio stream under a protocol such as advanced audio coding-low delay (AAC-LD), and sends the audio stream to a media server. In other words, generally, an original audio stream sent outward from a conference room is an audio stream obtained after performing encoding on an analog signal twice.

With the continuous development of globalization, collaboration between countries is unprecedentedly close. In such a context, a quantity of international conferences also increases. The diversity of languages in different countries also leads to a requirement for a simultaneous interpretation service during a conference. As an interpretation manner, simultaneous interpretation is characterized by high efficiency. An average interval between source text and interpretation is three to four seconds. Therefore, simultaneous interpretation can ensure continuous speech of a speaker without affecting or interrupting thinking of the speaker. This is helpful for audiences to understand an entire speech.

During a conference, an interpreter sits in a small room with good sound insulation (commonly referred to as "a box") and uses a professional device to interpret content heard from a headset into a target language and output the content through a microphone. A participant who needs a simultaneous interpretation service may set a language required by the participant by using an apparatus for receiving an audio stream, and then obtain interpreted information.

Figure 1:
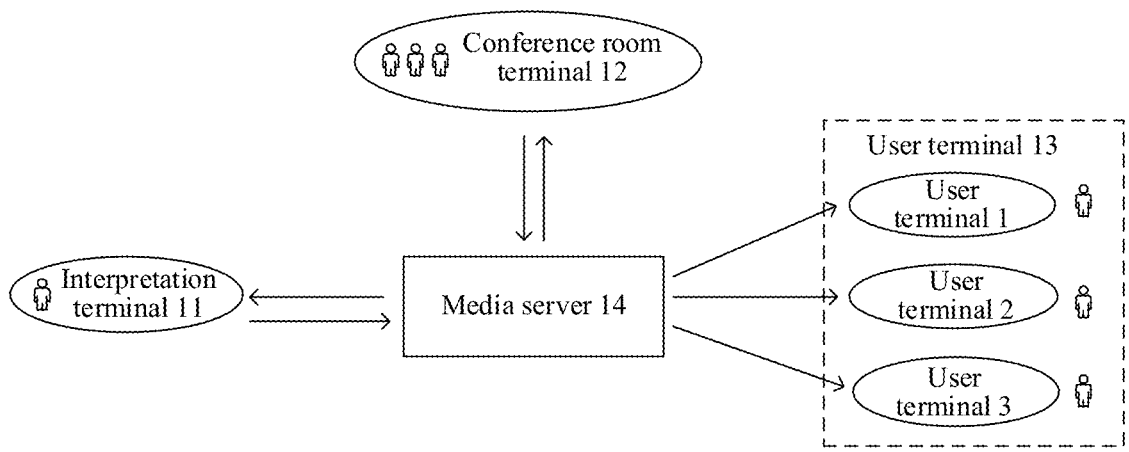
FIG. 1 is an architectural diagram of a system for implementing conference simultaneous interpretation by manually setting an output language according to this disclosure.

As shown in FIG. 1, a simultaneous interpretation system mainly includes an interpretation terminal 11, a conference room terminal 12, a user terminal 13, and a media server 14.

The interpretation terminal 11 is a device for an interpreter to receive an audio stream of a speaker or a device for outputting an audio stream interpreted by the interpreter. The device may be a handheld mobile terminal, for example, a mobile phone, or the device may be a personal computer. In addition, as an interpreter for an international conference, an interpretation service of the interpreter is usually bidirectional, for example, bidirectional interpretation between Chinese and English. During a conference, the interpreter will change a language outputted by the interpreter at any time as the language of the speaker changes.

The conference room terminal 12 is usually located in a conference room in which the speaker is located, and is connected to a microphone of the speaker to collect original voice of the speaker. In addition, the conference terminal 12 further includes a signal sending and receiving module, configured to send a compressed original audio stream to the media server, and further configured to receive an interpreted audio stream. In addition, the conference room terminal 12 may further include a loudspeaker unit, for example, a loudspeaker or a stereo, configured to broadcast the original voice of the speaker and the interpreted audio stream. Before sending an audio stream to the media server, the conference terminal needs to encode an analog signal collected by the microphone into a PCM stream, encode the PCM stream into an audio stream under a protocol such as ACC-LD, and send the audio stream to the media server. Encoding and decoding the audio stream in a conference system is not described in detail in the present disclosure. For ease of description, each audio stream (an original audio stream and an interpreted audio stream) in the following of this disclosure mainly emphasize a language of the audio stream, and whether the audio stream is encoded or decoded is not limited. The conference room terminal 12 has a plurality of forms, which may be a large-screen terminal, or may be a computer connected to a stereo. A specific form of the conference terminal is not limited in this disclosure.

The user terminal 13 includes a terminal 1, a terminal 2, and a terminal 3, and corresponding users are a user 1, a user 2, and a user 3. Languages of the user 1, the user 2, and the user 3 may be the same or may be different. Each user may choose to receive an audio stream in only one language or receive the original audio stream and an audio stream in another language. The user 1, the user 2, and the user 3 may be in the conference room or anywhere else. The user terminal may be a handheld mobile terminal, or may be various devices that can output audio, for example, a personal computer.

The media server 14 is a media processing server, and may be an MCU or an SFU. The media server may be deployed on a cloud or in a local equipment room. In this embodiment of the present disclosure, the media server is mainly configured to forward the audio stream of the speaker and the audio stream outputted by the interpreter based on a language configured by each terminal (the user terminal or the conference room terminal).

Each terminal may communicate with the media server 14 through a network. The network includes a wired and/or wireless transmission manner. The wired transmission manner includes data transmission in a form of Ethernet, an optical fiber, or the like. The wireless transmission manner includes a broadband cellular network transmission manner, for example, third generation (3G), fourth generation (4G), or fifth generation (5G).

Figure 2:
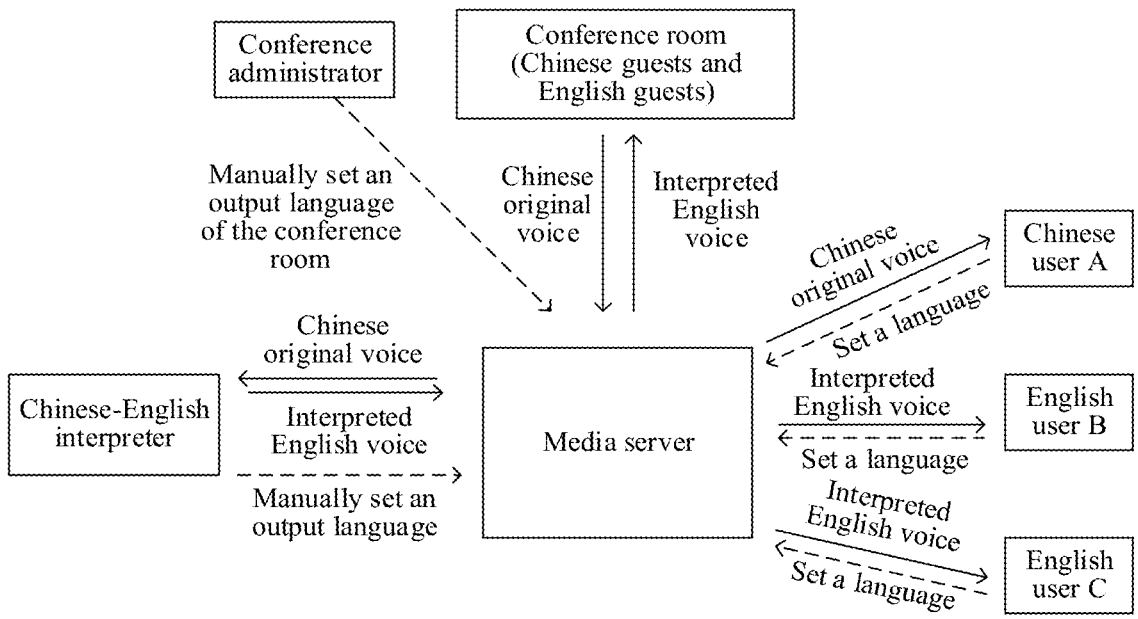
FIG. 2 is a schematic diagram of a method for implementing conference simultaneous interpretation by manually setting an output language according to this disclosure.

As shown in FIG. 2, it is assumed that Chinese and English are supported in a conference. A process of manually setting an output language to implement simultaneous interpretation includes the following steps.

Step 1: When joining a conference, a Chinese user A, an English user B, and an English user C set languages of an audio stream that the users want to receive to Chinese, English, and English respectively through terminals, so that a media server identifies a language expected by each user, and forwards a corresponding audio stream to a corresponding terminal.

Step 2: It is assumed that a language of a current speaker is Chinese, a conference administrator needs to manually set a language of a conference room to Chinese, so that the media server can identify the language of the speaker as Chinese. To be specific, a manual operation of the conference administrator may help the media server identify a language of an original audio stream sent by a conference room terminal.

Step 3: A conference room terminal sends an original audio stream to the media server, and the media server forwards the original audio stream to an interpreter after receiving the original audio stream. In another implementation, the conference room terminal may alternatively directly send the original audio stream to an interpretation terminal.

Step 4: An interpretation capability parameter of a Chinese-English interpreter is bidirectional interpretation between Chinese and English. After receiving the original audio stream, the interpreter outputs an interpreted audio stream through a sound receiving device, for example, a microphone. In addition, before interpretation, the interpreter needs to manually set an output language to English on an interpretation terminal, so that the media server can identify a language of the interpreted audio stream.

Step 5: The media server sends the original audio stream and the interpreted audio stream to corresponding user terminals based on the languages set by the user A, the user B, and the user C.

Step 6: After the speaker changes, and when a changed speaker speaks in English, the conference administrator needs to manually set the language of the conference room to English, so that the media server can identify a language of the changed speaker. In addition, after receiving an English original audio stream, the interpreter further needs to change the output language of the interpreter to Chinese through the interpretation terminal again before formal interpretation is performed, so that the media server identifies a language of an interpreted audio stream. Then, the media server re-forwards a corresponding audio stream based on settings of the users and the conference room.

The foregoing simultaneous interpretation method has low efficiency and is prone to errors. The conference administrator needs to keep up with a conference process. When the speaker changes a language, the conference administrator needs to switch an output language of the conference room in time. If the conference administrator is absent-minded or incorrectly switches the language, the media server cannot identify a language of an audio stream outputted from the conference room, leading to confusion of conference languages. After receiving the original audio stream of the speaker, the interpreter needs to set the output language of the interpreter first. However, the interpreter has a high work strength. If the interpreter further needs to set the output language before interpretation, the interpreter may easily forget to change the setting or switch the language incorrectly. This will still cause confusion of conference languages, affect experience of participants, and even interrupt the conference.

Figure 3:
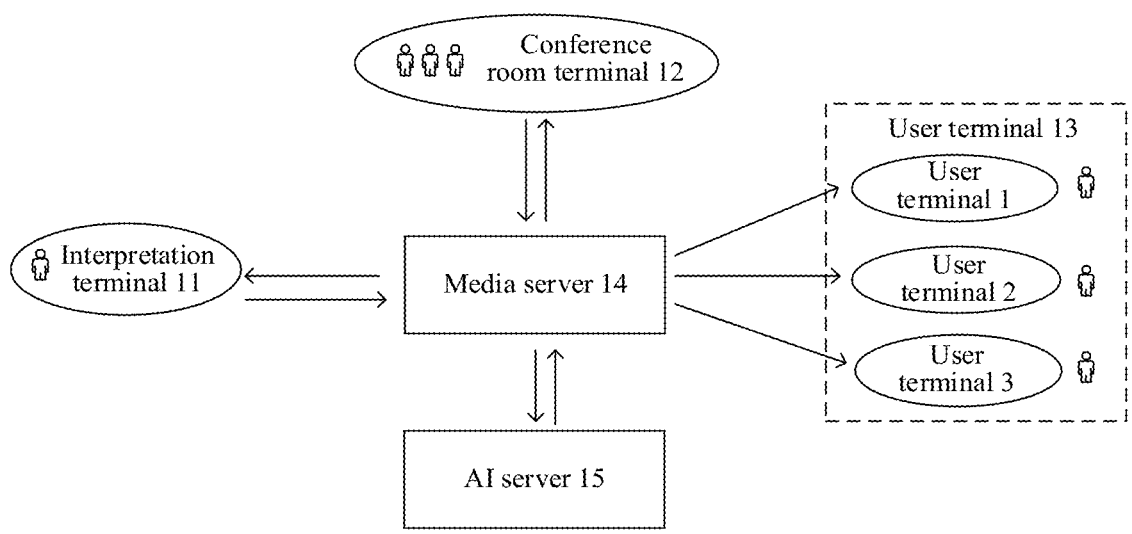
FIG. 3 is an architectural diagram of a system for implementing conference simultaneous interpretation according to this disclosure.

To resolve the foregoing problems, this disclosure provides a method for implementing simultaneous interpretation. A corresponding system architecture is shown in FIG. 3, and an AI server 15 is added based on the architecture in FIG. 1. The AI device 15 may be deployed on a cloud, or may be deployed in a local equipment room. From a perspective of a hardware architecture of a server, the AI device generally uses a heterogeneous server. In a heterogeneous manner, different combinations may be used based on an application scope, for example, central processing unit (CPU)+ graphical processing unit (GPU), CPU+ Tensor Processing Unit (TPU), and CPU+another acceleration card. Currently, the AI device generally uses a form of CPU+ GPU. Different from a CPU, a GPU uses a mode of parallel computing and is good at sorting out intensive data computing, for example, graphics rendering and machine learning. To ensure communication efficiency, in a possible implementation, the AI device 15 and the media server 14 are integrated together and deployed on a cloud. In another possible implementation, the media server 14 is deployed in a customer equipment room, and the AI device is deployed on a cloud. In another possible implementation, the AI device 15 and the media server 14 are integrated together and deployed in a customer equipment room.

In the system architecture shown in FIG. 3, functions of a conference room terminal include sending an original audio stream of a speaker and receiving an interpreted audio stream. In another possible implementation, the conference room terminal may broadcast only the original audio stream, and does not broadcast the interpreted audio stream. In this case, the media server does not need to forward the interpreted audio stream to the conference room terminal. The media server only needs to send the interpreted audio stream to a user terminal. In other words, a flow direction of the interpreted audio stream depends on a setting of a conference administrator and a setting of a user. In addition, in some cases, original voice of a speaker may alternatively be directly transmitted to an interpreter for interpretation without being forwarded by the media server. However, in the following description, this embodiment of this disclosure still takes an example in which the original voice of the speaker needs to be forwarded by the media server to the interpreter. That is, the media server performs overall control and forwarding.

Before a specific implementation method of this embodiment of this disclosure is described, some supplementary descriptions are first provided for a conference scenario of simultaneous interpretation. In an actual international conference scenario, a conference usually includes participants corresponding to at least two languages. However, for the sake of on-site experience, usually, only two languages can be broadcast on a conference site. The two broadcast languages are preset by a conference administrator. For example, a standard United Nations international conference generally includes six languages: Arabic, Chinese, English, French, Russian, and Spanish. Correspondingly, the conference site also includes leaders and journalists or related staff of the six countries. If each word spoken by a speaker is correspondingly broadcast by using the remaining five languages, on-site languages are confused, thereby affecting user experience. Therefore, only two languages set by the conference administrator are broadcast on site. It is assumed that the languages set by the conference administrator are Chinese and English. When a Chinese speaker speaks, an original audio stream of the Chinese speaker is broadcast on-site first, and a large-screen terminal on site also broadcasts interpreted English. In this case, on-site audiences from the four countries, namely, Arab, France, Russia, and Spain, need to wear headsets to receive audio of corresponding languages. In other words, the on-site audiences from the four countries are equivalent to the user 1, the user 2, and the user 3 corresponding to the user terminal 1, the user terminal 2, and the user terminal 3 in FIG. 3. It should be noted that the foregoing description of the conference site is merely intended to increase the integrity of this solution, and does not constitute any limitation on the present disclosure.

Figure 4:
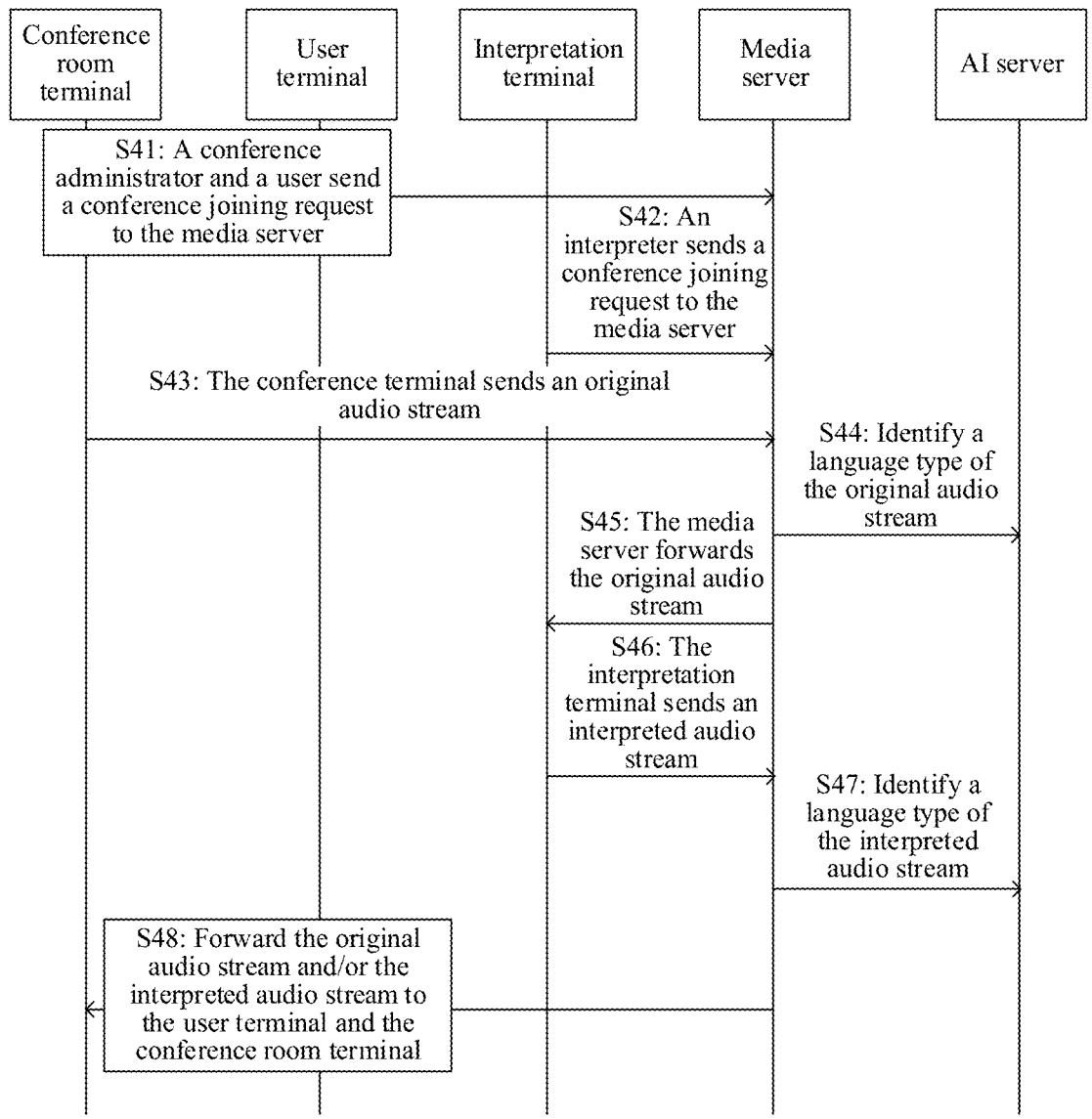
FIG. 4 is an overall flowchart of implementing conference simultaneous interpretation according to this disclosure.

With reference to FIG. 4, the following describes an overall method procedure provided in an embodiment of this disclosure.

Step S41: A media server receives conference joining requests sent by a user and a conference administrator through respective terminals, where the requests include language setting information. When joining a conference, the user and the conference administrator generate language setting information through respective terminals, and send the language setting information to the media server. The language setting information indicates a language of an audio stream that the user or a conference room expects to receive.

The user may set to receive an audio stream in only one language, or may set to receive an original audio stream and an audio stream in another language. The conference administrator may set not to receive an interpreted audio stream. In other words, only the original audio stream is broadcast in the conference room. Alternatively, the conference administrator may set to receive audio streams of one or two languages.

In an implementation, after receiving the conference joining request sent by the user or the conference administrator, the media server allocates different User Datagram Protocol (UDP) ports to a user terminal and a conference terminal. The media server can send and receive an audio stream to and from each terminal (the user terminal and the conference room terminal) only by monitoring a corresponding UDP port. In another implementation, each terminal (the user terminal and the conference room terminal) negotiates a synchronization source identifier (SSRC) thereof with the media server through the conference joining request. Then each terminal carries the pre-negotiated SSRC in an audio stream packet when sending the packet, so that the media server distinguishes the audio stream from each terminal.

Step S42: The media server receives a conference joining request sent by an interpreter through a terminal. For example, the interpreter, and the user and the conference administrator in Step S41 may enter a same conference identifier (ID) to join a same conference. In a possible implementation, the conference joining request of the interpreter further includes an interpretation capability parameter, and the interpretation capability parameter indicates a service scope of the interpreter, for example, bidirectional interpretation between Chinese and English or bidirectional interpretation between English and French. Same as Step S42, after receiving the conference joining request sent by the interpreter through an interpretation terminal, the media server allocates a UDP port to the interpreter terminal, and then sends and receives an audio stream to and from the interpreter terminal through the UDP port.

Step S43: The media server receives an original audio stream sent by a conference room terminal. When the conference officially starts, a speaker starts to make a speech, and the conference room terminal forwards the original audio stream to the media server.

Step S44: The media server forwards the original audio stream to an AI device to identify a language of the original audio stream. The media server identifies the language of the original audio stream based on language identification information returned by the AI device. The language identification information may directly be a language identification result of the AI device, or may be text that is generated by the AI device and that corresponds to the original audio stream.

Step S45: The media server forwards the original audio stream to an interpretation terminal.

In an implementation, the media server forwards the audio stream to each interpretation terminal. To be specific, regardless of the service scope of each interpreter, the original audio stream is forwarded to the interpretation terminal used by each interpreter.

In another possible implementation, the media server forwards the original audio stream to a corresponding interpretation terminal based on the interpretation capability parameter of each interpreter. For example, an interpretation capability parameter of an interpreter 1 is bidirectional interpretation between Chinese and English, and an interpretation capability parameter of an interpreter 2 is bidirectional interpretation between English and French. When it is identified, based on Step S44, that the original audio stream is Chinese, the original audio stream is forwarded only to the interpreter 1 and is not forwarded to the interpreter 2. In this implementation, Step S44 needs to be performed before Step S45. In addition, the media server also needs to obtain the interpretation capability parameter of the interpreter before the conference starts. The interpretation capability parameter of the interpreter may be obtained in a plurality of manners. For example, the joining request sent by the interpretation terminal in Step S42 may carry the interpretation capability parameter; or the media server presets, for each interpretation terminal, the interpretation capability parameter of an interpreter corresponding to the interpretation terminal, and then the interpreter selects a corresponding terminal to perform interpretation based on a setting of each terminal.

Step S46: The media server receives an interpreted audio stream sent by the interpretation terminal.

Step S47: The media server sends the interpreted audio stream to the AI device to identify the interpreted audio stream. An identification method is the same as that in step 44. Details are not described herein again.

Step S48: The media server forwards the original audio stream and the interpreted audio stream to each terminal (the user terminal, the conference room terminal, or the interpretation terminal) based on the language of the original audio stream and the language of the interpreted audio stream.

Step S41 to Step S48 describe a relatively complete method procedure for implementing simultaneous interpretation. It should be noted that sequence numbers of the foregoing steps do not represent an execution sequence. For example, in some cases, Step S46 may be performed before Step S44. In addition, some steps may be directly omitted based on a deployment form of the AI device and the media server. For example, when the AI device and the media server are deployed together, steps like forwarding a to-be-identified audio stream to the AI device and receiving returned information from the AI device may be omitted, and the media server directly identifies a language of the audio stream.

In a possible implementation, a language setting of each user includes receiving the original audio stream. To be specific, each user expects to receive the original audio stream of the speaker regardless of any language in which the speaker speaks. In this case, the media server also does not need to send the original audio stream to the AI device for identification. In other words, Step S44 does not need to be performed. In addition, because the language of the original audio stream is not identified, when forwarding the original audio stream to the interpreter (Step S45), the media server also needs to adopt a policy of forwarding the original audio stream to all interpreters. In other words, each interpreter receives the original audio stream.

In the foregoing method for implementing simultaneous interpretation, the conference administrator does not need to manually switch the language outputted from the conference room based on a change of the speaker, thereby reducing a probability of a language error on a conference site. The interpreter also does not need to change the output language of the interpreter on a terminal each time when an interpretation direction is switched, thereby reducing pressure of the interpreter. The media server performs control and forwarding in the entire conference process. This reduces manual participation and improves efficiency of simultaneous interpretation.

Figure 5:
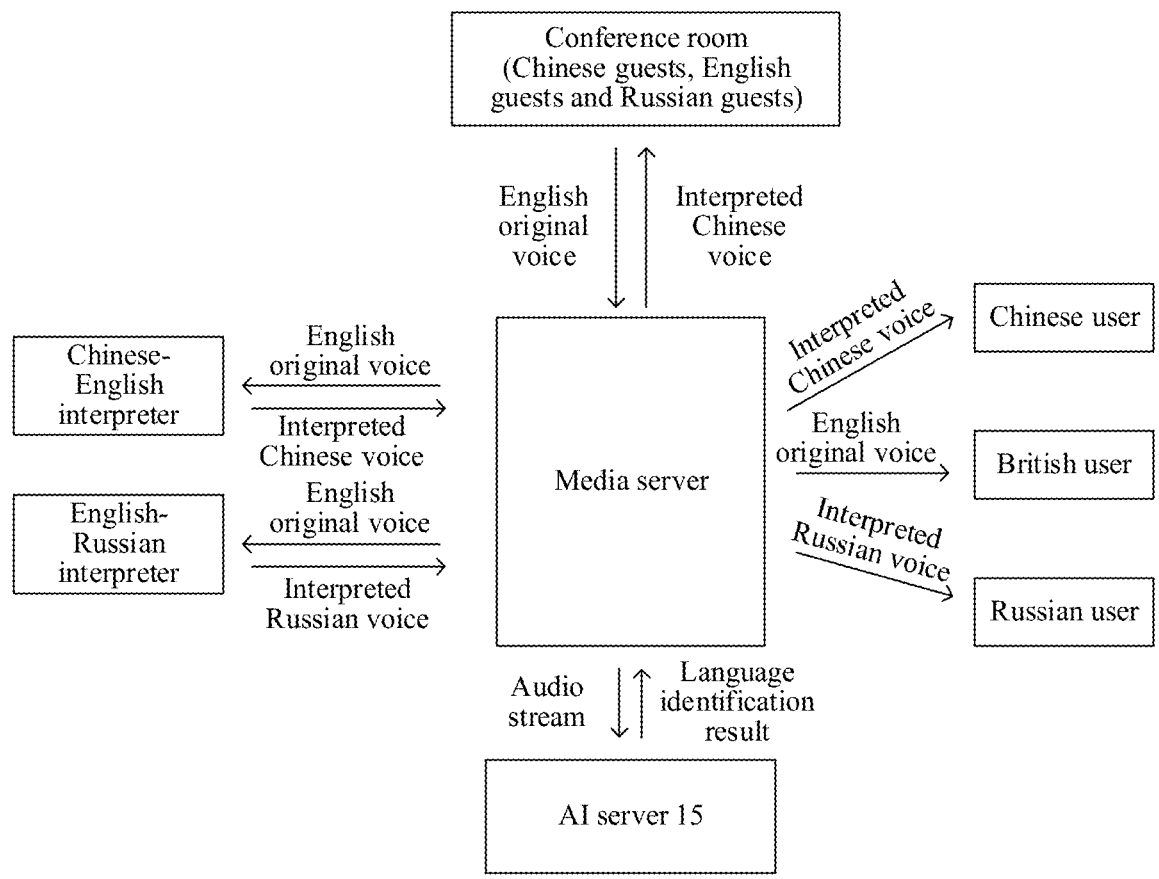
FIG. 5 is a schematic diagram of a method for implementing conference simultaneous interpretation according to this disclosure.
Figure 6:
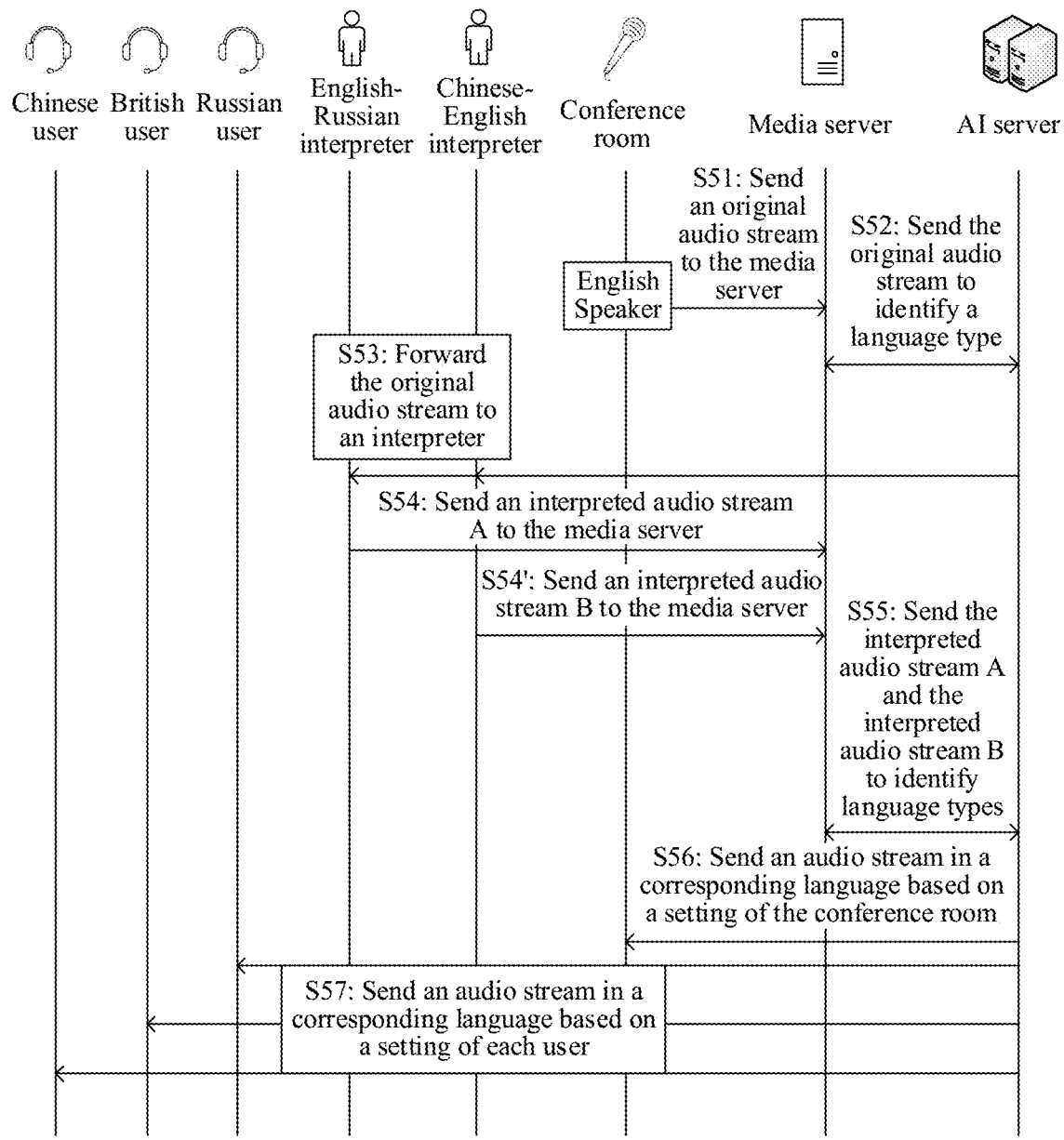
FIG. 6 is a flowchart of a method for implementing conference simultaneous interpretation according to this disclosure.

The following takes FIG. 5 and FIG. 6 as examples to describe in detail a method for implementing simultaneous interpretation provided in embodiments of this disclosure. For ease of description, it is assumed that an entire conference involves three languages: Chinese, English, and Russian. It is assumed that when a Chinese user, a British user, and a Russian user send a conference joining request to a media server through respective mobile terminals, the Chinese user, the English user, and the Russian user respectively set a language of an audio stream that the users expect to receive to Chinese, English, and Russian. In addition, a conference administrator also sets a language of an interpreted audio stream received by a conference room to Chinese or English in a conference joining request sent by a conference room terminal. In this embodiment of this disclosure, interpreters on a conference site include a Chinese-English interpreter and an English-Russian interpreter. The users, the conference administrator, and the interpreters corresponding to user terminals, the conference room terminal, and interpretation terminals may join a same conference by entering a same conference ID. The following will introduce directly from a stage where a speaker starts giving a speech.

Step S51: It is assumed that an English speaker first goes to a stage to give a speech, the conference room terminal collects an original audio stream of the speaker through a sound receiving device such as a microphone, and sends the original audio stream to a media server.

Step S52: The media server sends the original audio stream to an AI device to identify a language of the original audio stream. The AI device may directly return a language identification result, or may return text corresponding to the original audio stream, so that the media server determines the language of the original audio stream based on the text. It should be noted that, if the AI device and the media server are deployed in a same server cluster, this step may be directly omitted. In other words, the media server may directly identify the language of the original audio stream.

Step S53: The media server sends the original audio stream of the speaker to an interpreter. The interpreter receives the audio stream through a device such as a mobile terminal or a computer. In this step, the media server may selectively forward the original audio stream to interpreters with different interpretation capability parameters, or may choose to forward the original audio stream to all interpreters. This mainly depends on a setting of the conference or each interpreter. When selective forwarding is performed, the interpretation capability parameters of the interpreters need to be collected in advance. In this embodiment of this disclosure, when sending the original audio stream to the interpretation terminal of the interpreter, the media server adopts a policy of forwarding the original audio stream to all interpreters. In other words, the media server forwards the original audio stream to all interpreters (the Chinese-English and the English-Russian interpreters shown in FIG. 5).

Step S54: The interpreter performs interpretation based on the original audio stream, and an interpretation terminal sends an interpreted audio stream to the media server. In embodiments provided in this disclosure, the interpreter does not need to pay attention to an output language of the interpreter, and the interpreter only needs to interpret heard content into another language based on professional instincts. It is assumed that an audio stream interpreted by the Chinese-English interpreter is an audio stream A, and an audio stream interpreted by the English-Russian interpreter is an audio stream B.

Step S55: The media server sends an interpreted audio stream (an audio stream A and an audio stream B) sent by the interpreter through the interpretation terminal to the AI device, to identify a language of the interpreted audio stream. Same as Step S52, the media server may receive a language identification result returned by the AI device or text corresponding to the audio stream to determine a language of the audio stream. In addition, if the AI device and the media server are deployed in the same server cluster, actions of sending an audio stream and receiving a language identification result may be directly omitted.

Step S56: The media server sends the interpreted audio stream based on a language set by a conference room. For the sake of better user experience, one conference room broadcasts at most two languages. As mentioned above, the conference administrator has set a language of the received interpreted audio stream to English or Chinese, and the audio stream is mainly broadcast in English. Under such a setting rule, if a Chinese speaker gives a speech, original voice of the speaker and interpretation in English are broadcast on the conference site; if a Russian speaker gives a speech, original voice of the speaker and interpretation in English are broadcast on the conference site; and if an English speaker gives a speech, original voice of the speaker and interpretation in Chinese are broadcast on the conference site. In Step S52, the media server has determined, based on a result returned by the AI device, that the language of the speaker in the current conference room is English, and in Step S55, the media server has determined that the audio stream A is Chinese and the audio stream B is Russian. According to a rule set by the conference administrator (the language of an audio stream expected to be received includes Chinese and English), the media server sends the audio stream A outputted by the Chinese-English interpreter to the conference room terminal.

Step S57: The media server forwards a corresponding audio stream based on a language setting of each user. The media server forwards the original audio stream to the British user, forwards the audio stream A to the Chinese user, and forwards the audio stream B to the Russian user.

It should be noted that a sequence of Step S52 to Step S55 is not specifically limited in this disclosure. The original audio stream may be sent to the AI device for identification after being received, and then the original audio stream is sent to the interpretation terminal; or the original audio stream may be forwarded to the interpretation terminal after being received, and then the original audio stream and the interpreted audio stream are sent to the AI device for identification.

It should be further noted that different policies may also be used for language identification frequency. In an implementation, the original audio stream of the speaker needs to be continuously transmitted to the AI device for identification, so as to quickly identify a language change of the speaker, thereby implementing accurate forwarding. The AI device may send a language identification result to the media server when an identified language changes. In another implementation, the media server may send the original audio stream intermittently to save network transmission resources or send the original audio stream to the media server, where an interval may be set based on experience.

In the foregoing embodiments, a relatively small quantity of languages are involved on the conference site. However, in an actual situation, a conference involves a relatively large quantity of languages, and in consideration of conference costs, a quantity of interpreters may be insufficient, as a result, it cannot be implemented that a speaker of each language has corresponding interpreters of all other languages. For example, it is assumed that the language of the speaker is Russian, languages supported by the conference includes Chinese (in other words, there may be Chinese audiences), and there is no Russian-Chinese interpreter on site, in this case, an interpretation relay is required. To be specific, an interpreter is required to interpret Russian into English, and then another interpreter is required to interpret English into Chinese. In this case, the policy for the media server to forward the original audio stream to the interpreter is the same as that described above. The media server may forward the original audio stream to all interpreters or only to interpreters of related languages. However, a difference is that during the interpretation relay, the media server further needs to forward an English stream outputted by the Russian-English interpreter to the English-Chinese interpreter to obtain a Chinese audio stream. For the sake of an interpretation effect, the relay is usually performed only once. The media server may determine an optimal relay policy based on the language of the speaker, an interpretation capability of each interpreter, and the language of an audio stream finally required by the conference. The language of an audio stream finally required by the conference may be set by the conference administrator in a unified manner, or may be determined based on a language of an audio stream that each user reports and expects to receive. In the case of an interpretation relay, the media server needs to implement audio stream forwarding between interpretation terminals based on a calculated relay policy.

Figure 7:
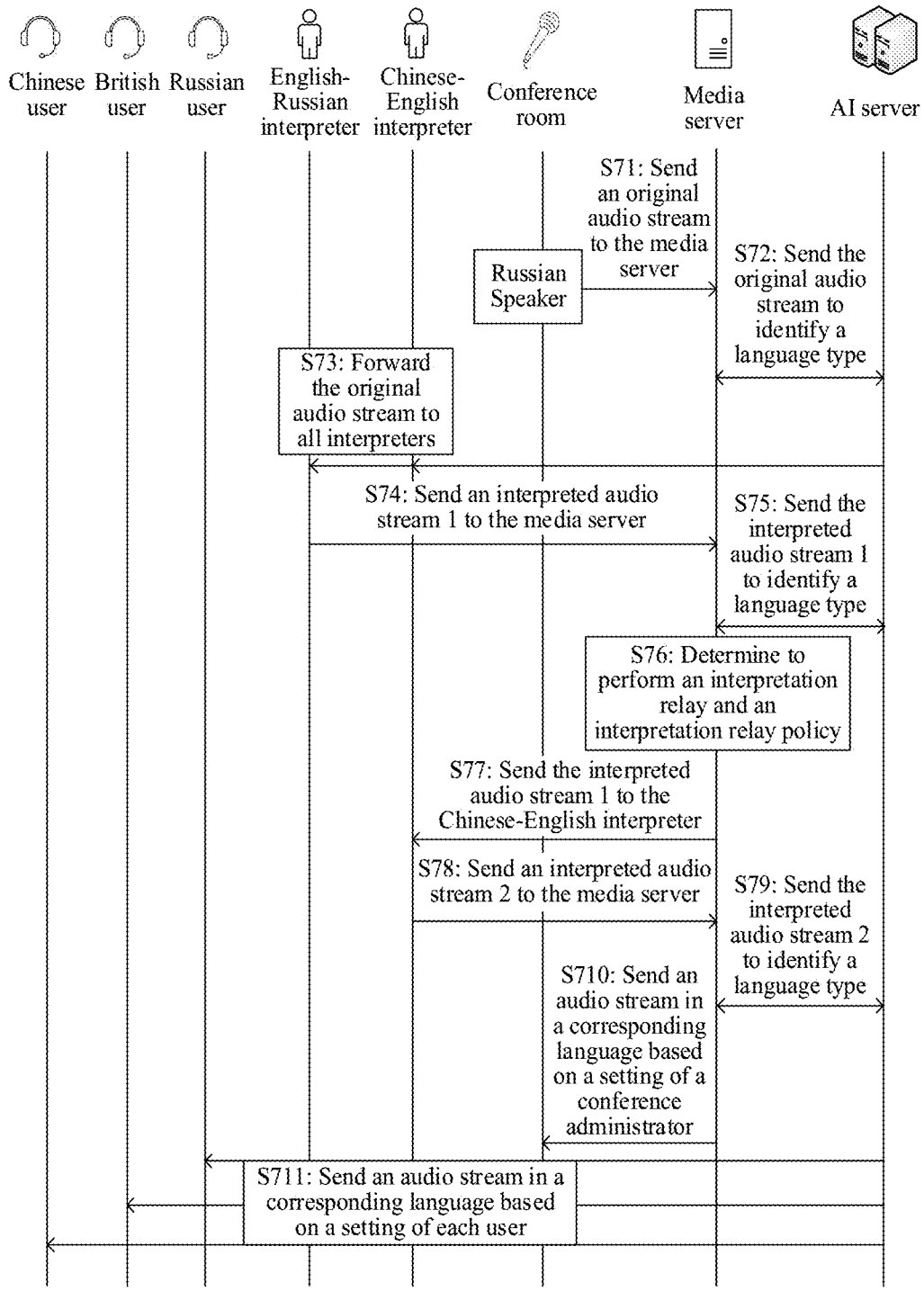
FIG. 7 is a flowchart of another method for implementing conference simultaneous interpretation according to this disclosure.

When the speaker changes, the advantages of embodiments of this disclosure become more apparent. It is assumed that when the speaker changes, the language of the speaker changes from English to Russian. Based on the interpretation capabilities of the interpreters on site, it may be determined that an interpretation relay is required. When an interpretation relay is required, the media server needs to obtain an interpretation capability parameter of each interpreter on site in advance, so as to implement audio stream forwarding between interpretation terminals. With reference to FIG. 7, a process of simultaneous interpretation after the speaker changes is as follows:

Step S71: A Russian speaker gives a speech, and a conference room terminal sends an original audio stream to a media server.

Step S72: The media server forwards the original audio stream to an AI device, to identify that a language of the original audio stream is Russian.

Step S73: The media server sends the original audio stream to an interpretation terminal. It is assumed that in this embodiment of this disclosure, the policy of sending the original audio stream to all interpreters is still adopted. In other words, interpretation terminals used by all interpreters (the Chinese-English interpreter and the English-Russian interpreter) receive the original audio stream.

Step S74: After receiving the original audio stream, an English-Russian interpreter directly interprets heard Russian into English, and sends an interpreted audio stream 1 to the media server without setting an output language on the terminal.

Step S75: The media server sends the audio stream outputted by the English-Russian interpreter to the AI device, so as to identify that a type of the interpreted audio stream is English.

Step S76: The media server determines that an interpretation relay is required, and calculates an interpretation relay policy. The media server determines that the current conference requires audio streams in Chinese, English, and Russian based on a setting of the conference administrator or a situation of accessed users. It may be determined, based on Step S72, that the original audio stream is Russian, and it may be determined, based on Step S75, that an interpreted audio stream outputted by an interpreter is English, so that it may be determined that there is no Chinese audio stream in this case. It is determined, based on the interpretation capability parameter provided by each interpreter, that a Chinese-English interpreter exists on site, and therefore, the English interpretation audio stream may be forwarded to the interpreter to obtain a Chinese interpretation audio stream.

Step S77: The media server sends the interpreted audio stream 1 to a Chinese-English interpreter. The media server determines that the audio stream 1 is an English audio stream based on Step S75, and then forwards the interpreted audio stream 1 to the Chinese-English interpreter based on the relay policy calculated based on Step S76.

Step S78: The media server receives an interpreted audio stream 2 sent by the Chinese-English interpreter. In this step, after receiving the English audio stream, the Chinese-English interpreter directly interprets English into Chinese based on professional instincts, and does not need to manually set, on the terminal, a language of an audio stream outputted by the interpreter.

Step S79: The media server sends the received interpreted audio stream 2 to the AI device to identify that a language of the audio stream is Chinese.

Step S710: The media server forwards a corresponding audio stream based on a setting of a conference administrator. It is assumed that the conference administrator sets a language of the interpreted audio stream received by a conference terminal to Chinese and English, the media server forwards both the interpreted audio streams 1 and 2 to the conference terminal.

Step S711: The media server forwards a corresponding audio stream based on a setting of each user. Based on the setting of each user, the media server forwards the original audio stream to a Russian user, forwards the interpreted audio stream 1 to an English user, and forwards the interpreted audio stream 2 to a Chinese user.

It should be noted that the sequence numbers of the foregoing steps do not necessarily represent an execution sequence. In addition, in some cases, some steps may be omitted. For example, in Step S79, because this is an interpretation relay scenario, and the media server has determined the interpretation capability of each interpreter, after forwarding the English audio stream to the Chinese-English interpreter, the media server should receive a Chinese audio stream. In this case, the media server does not need to send the audio stream 2 to the AI service to determine the language of the audio stream 2. However, for the sake of accuracy and to ensure that there is no mistake during conference interpretation, all obtained audio streams need to be sent to the AI device to identify languages.

In addition to the method process described above, in a specific implementation of this solution, to reduce crosstalk, the media server further needs to buffer the audio stream before sending the audio stream to the user terminal or the conference room terminal. In an implementation, a transmission unit of an audio stream is formed in a time dimension during audio stream transmission. It is assumed that an audio packet is formed every 100 milliseconds (ms). In other words, the conference terminal or the interpretation terminal sends an audio stream packet to the media server every 100 ms. Each time the media server receives an audio packet, the media server sends the audio packet to the AI device to identify a language of the audio packet. It is assumed that it takes 300 ms for the AI device to identify a language of an audio packet, and a transmission delay between the media server and the AI device is ignored. In this case, the media server can receive a language identification result of the first audio packet only after receiving three audio packets, and then forwards the first audio packet to a corresponding user terminal or a corresponding conference room terminal. If the media server does not buffer the audio stream, the media server finds that the language of the first audio packet has been changed only when receiving the third audio packet. In this case, the first and second audio packets are sent to the user or the conference room by mistake, resulting in crosstalk and affecting user experience. In another implementation, the media server sends a to-be-identified audio stream to the AI device, and the AI device divides the received audio stream according to a preset rule, and then feeds back language identification information of each segment of audio stream after division to the media server. For example, the preset rule of the AI device includes identifying a language type based on sentence segmentation of a speaker. In other words, the AI device needs to first identify a sentence segmentation situation in the audio stream, and then divide the received audio stream by using each segmented sentence as a unit, so as to return language identification information of each sentence to the media server. In conclusion, in this embodiment of this disclosure, a unit, a size, duration, and the like of the buffer and the identified audio stream are not specifically limited, and are determined according to an actual case.

The foregoing method for implementing simultaneous interpretation reduces manual participation and improves interpretation efficiency. This method does not require a dedicated conference administrator to set the language of the conference room (the language of the current speaker), which reduces the manpower occupation and an error probability. The interpreter does not need to set the output language each time the interpreter switches the language, which reduces the pressure of the interpreter. The AI device identifies the language of the speaker and the language outputted by the interpreter in a unified manner, thereby improving the accuracy of language switching and reducing the influence of human factors on simultaneous interpretation.

With a development of the era, interpretation work of an interpreter may also be replaced by the AI device. In other words, simultaneous interpretation throughout the conference is implemented by the AI device.

Figure 8:
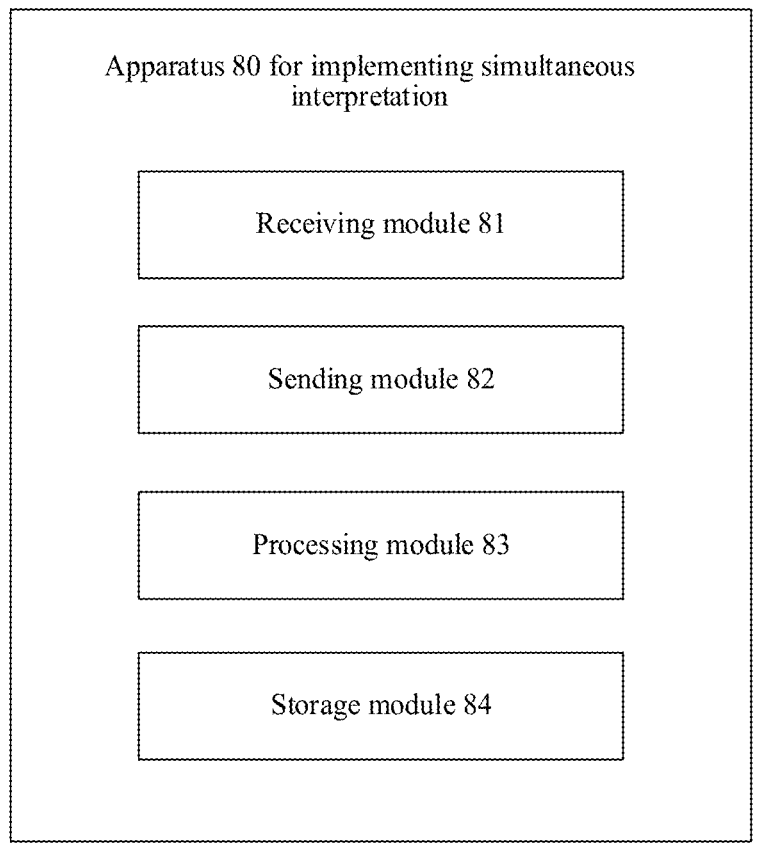
FIG. 8 is a schematic diagram of a structure of a conference simultaneous interpretation device according to this disclosure.

FIG. 8 shows an apparatus 80 for implementing simultaneous interpretation according to an embodiment of this disclosure. The apparatus 80 may be implemented as a part or all of the apparatus by software, hardware, or a combination thereof. The apparatus provided in this embodiment of this disclosure may implement the procedures in FIG. 4 to FIG. 7 in embodiments of this disclosure. The apparatus 80 includes a receiving module 81 and a sending module 82.

The receiving module 81 is configured to receive a first audio stream and a second audio stream, where the second audio stream is an audio stream interpreted based on the first audio stream.

The sending module 82 is configured to send the second audio stream to an AI device to identify a language of the second audio stream; and is further configured to send the second audio stream to a first terminal based on the language of the second audio stream, where the language of the second audio stream is a language of an audio stream that the first terminal expects to receive.

Optionally, the sending module 82 is further configured to send the first audio stream to the AI device to identify a language of the first audio stream, and is further configured to send the first audio stream to a second terminal based on the language of the first audio stream, where the language of the first audio stream is a language of an audio stream that the second terminal expects to receive.

Optionally, the apparatus 80 for implementing simultaneous interpretation further includes a processing module 83. The processing module 83 is configured to determine the language of the second audio stream based on a language identification result that is of the second audio stream and that is returned by the AI device.

Optionally, the receiving module 81 is further configured to receive text corresponding to the second audio stream and returned by the AI device; and the processing module 83 is further configured to determine the language of the second audio stream based on the text.

Optionally, the sending module 82 is further configured to send the first audio stream to interpretation terminals used by all interpreters; and the receiving module 81 is further configured to receive the second audio stream, where the second audio stream is one of audio streams returned by the interpretation terminals used by all the interpreters.

Optionally, the language of the first audio stream is a first language, the language of the second audio stream is a second language. The sending module 82 is further configured to send the first audio stream to a third terminal based on a language identification result that is of the first audio stream and that is returned by the AI device and a first interpretation capability parameter. The first interpretation capability parameter indicates that an interpretation capability of a first interpreter that uses the third terminal includes interpreting the first language into the second language. The receiving module 81 is further configured to receive the second audio stream sent by the third terminal.

Optionally, the receiving module 81 is further configured to receive the first interpretation capability parameter sent by the third terminal.

Optionally, the language of the first audio stream is a first language, the language of the second audio stream is a second language. The processing module 83 is further configured to determine a fourth terminal and a fifth terminal based on a language identification result that is of the first audio stream and that is returned by the AI device, a second interpretation capability parameter, and a third interpretation capability parameter. The second interpretation capability parameter indicates that an interpretation capability of a second interpreter that uses the fourth terminal includes interpreting the first language into a third language. The third interpretation capability parameter indicates that an interpretation capability of a third interpreter that uses the fifth terminal includes interpreting the third language into the second language. The sending module 82 is further configured to send the first audio stream to the fourth terminal. The receiving module 81 is further configured to receive a third audio stream sent by the fourth terminal, where a language of the third audio stream is the third language. The sending module 82 is further configured to send the third audio stream to the fifth terminal. The receiving module 81 is further configured to receive the second audio stream sent by the fifth terminal.

Optionally, the apparatus 80 for implementing simultaneous interpretation further includes a storage module 84, where the storage module 84 is configured to store the second audio stream; and the sending module 82 is further configured to start, by the media server after a determined moment, to send the second audio stream to the first terminal from the second audio stream stored before the determined moment. The determined moment is a moment at which a media service determines that the language of the second audio stream is the language that the first terminal expects to receive.

Optionally, the receiving module 81 is further configured to receive first language setting information sent by the first terminal, where the first language setting information indicates the language of an audio stream that the first terminal expects to receive; and is further configured to receive second language setting information sent by the second terminal, where the second language setting information indicates the language of an audio stream that the second terminal expects to receive.

Figure 9:
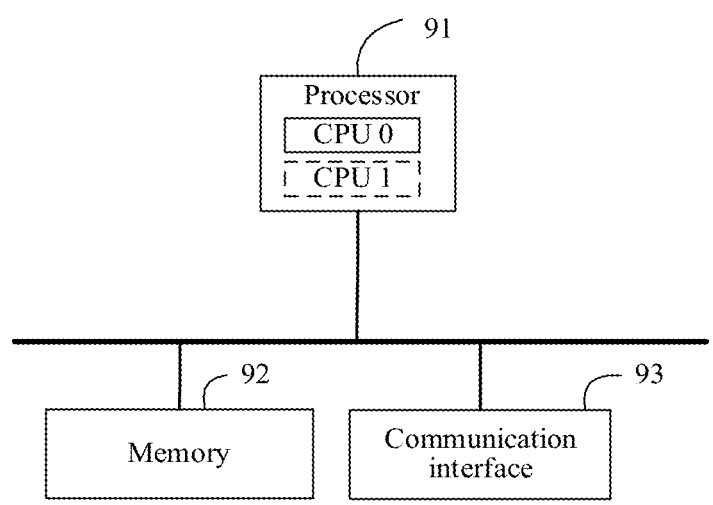
FIG. 9 is a schematic diagram of a structure of another conference simultaneous interpretation device according to this disclosure.

FIG. 9 shows a device 90 for implementing simultaneous interpretation according to an embodiment of this disclosure. As shown in the figure, the device 90 includes a processor 91, a memory 92, and a communication interface 93. The processor 91, the memory 92, and the communication interface 93 implement communication connections through wired or wireless transmission. The memory 92 is configured to store instructions, and the processor 91 is configured to execute the instructions. The memory 92 stores program code, and the processor 91 may invoke the program code stored in the memory 92 to perform the following operations: receiving a first audio stream and a second audio stream, where the second audio stream is an audio stream interpreted based on the first audio stream; sending the second audio stream to an AI device to identify a language of the second audio stream; and sending the second audio stream to a first terminal based on the language of the second audio stream, where the language of the second audio stream is a language of an audio stream that the first terminal expects to receive.

It should be understood that, in this embodiment of this disclosure, the processor 91 may be a CPU, or another general-purpose processor that can execute stored program code.

The memory 92 may include a read-only memory and a random-access memory (RAM), and provides instructions and data to the processor 91. The memory 92 may further include a non-volatile RAM. For example, the memory 92 may further store device type information. The memory 92 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a RAM. By way of example but not limitation, many forms of RAMs are available, for example, a DRAM, a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct Rambus random-access memory (DR RAM).

In addition to a data bus, a bus 94 may further include a power bus, a control bus, a status signal bus, and the like. However, for clear description, various buses are marked as the bus 94 in the figure.

In a possible embodiment, this disclosure further provides a system for implementing simultaneous interpretation. The system includes an apparatus 80 for implementing simultaneous interpretation and an AI device. In a possible implementation, the apparatus 80 for implementing simultaneous interpretation and the AI device are deployed in a same server. Apparatuses in the system for implementing simultaneous interpretation perform the methods shown in FIG. 4 to FIG. 7. For brevity, details are not described herein again.

All or some of the foregoing embodiments may be implemented by using software, hardware, firmware, or any combination thereof. When software is used for implementing embodiments, the foregoing embodiments may be implemented completely or partially in a form of a computer program product. The computer program product includes one or more computer instructions. When the computer program instructions are loaded or executed on a computer, all or some of the processes or the functions according to embodiments of this disclosure are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive (SSD).

The foregoing descriptions are merely specific implementations of this disclosure. Any variation or replacement readily figured out by a person skilled in the art based on the specific implementations provided in this disclosure shall fall within the protection scope of this disclosure.

What is claimed is:

1. A method, comprising:
  receiving a first audio stream and a second audio stream, wherein the second audio stream is based on an interpretation of the first audio stream;
  sending, to an artificial intelligence (AI) device, the second audio stream to identify a first language of the second audio stream;
  sending, to a first terminal based on the first language, the second audio stream;
  sending, to the AI device, the first audio stream to identify a second language of the first audio stream;
  sending, to a second terminal based on the second language, the first audio stream; and
  sending, to a third terminal based on a language identification result and a first interpretation capability parameter, the first audio stream,
  wherein the language identification result is of the first audio stream and is from the AI device,
  wherein the first interpretation capability parameter indicates that a first interpreter that uses the third terminal comprises interpreting the first language into the second language, and
  wherein receiving the second audio stream comprises receiving, from the third terminal, the second audio stream.

2. The method of claim 1, further comprising sending, to interpretation terminals, the first audio stream.

3. The method of claim 1, wherein before sending the first audio stream, the method further comprises receiving, from the third terminal, the first interpretation capability parameter.

4. The method of claim 1, further comprising obtaining, based on the language identification result that is of the second audio stream and that is from the AI device, the first language.

5. The method of claim 1, further comprising:
  receiving, from the AI device, text corresponding to the second audio stream; and
  obtaining, based on the text, the first language.

6. The method of claim 1, wherein before sending the second audio stream, the method further comprises:
  storing the second audio stream; and
  starting, after a media service obtains the first language, to send the second audio stream to the first terminal.

7. The method of claim 1, further comprising: receiving, from the first terminal, first language setting information, wherein the first language setting information indicates the first language.

8. An apparatus, comprising:
  a memory configured to store instructions; and
  one or more processors coupled to the memory and configured to execute the instructions to:
    receive a first audio stream and a second audio stream, wherein the second audio stream is based on an interpretation of the first audio stream;
    send, to an artificial intelligence (AI) device, the second audio stream to identify a first language of the second audio stream;
    send, to a first terminal based on the first language, the second audio stream;
    send, to the AI device, the first audio stream to identify a second language of the first audio stream;
    send, to a second terminal based on the second language, the first audio stream; and
    send, to a third terminal based on a language identification result and a first interpretation capability parameter, the first audio stream,
    wherein the language identification result is of the first audio stream and is from the AI device,
    wherein the first interpretation capability parameter indicates that a first interpreter that uses the third terminal comprises interpreting the first language into the second language, and
    wherein receiving the second audio stream comprises receiving, from the third terminal, the second audio stream.

9. The apparatus of claim 8, wherein the one or more processors are further configured to execute the instructions to send, to interpretation terminals, the first audio stream.

10. The apparatus of claim 8, wherein the one or more processors are further configured to execute the instructions to receive, from the third terminal, the first interpretation capability parameter.

11. The apparatus of claim 8, wherein the one or more processors are further configured to execute the instructions to obtain, based on the language identification result that is from the AI device, the first language.

12. The apparatus of claim 8, wherein the one or more processors are further configured to execute the instructions to:
   receive, from the AI device, text corresponding to the second audio stream; and
   obtain, based on the text, the first language.

13. The apparatus of claim 8, wherein the one or more processors are further configured to execute the instructions to:
   store the second audio stream; and
   start, after a media service obtains the first language, to send the second audio stream to the first terminal.

14. A computer program product comprising instructions stored on a non-transitory computer-readable medium that, when executed by one or more processors, cause an apparatus to:
   receive a first audio stream and a second audio stream, wherein the second audio stream is based on an interpretation of the first audio stream;
   send, to an artificial intelligence (AI) device, the second audio stream to identify a first language of the second audio stream;
   send, to a first terminal based on the first language, the second audio stream;
   send, to the AI device, the first audio stream to identify a second language of the first audio stream;
   send, to a second terminal based on the second language, the first audio stream; and
   send, to a third terminal based on a language identification result and a first interpretation capability parameter, the first audio stream,
   wherein the language identification result is of the first audio stream and is from the AI device,
   wherein the first interpretation capability parameter indicates that a first interpreter that uses the third terminal comprises interpreting the first language into the second language, and
   wherein receiving the second audio stream comprises receiving, from the third terminal, the second audio stream.

15. The computer program product of claim 14, wherein the one or more processors are further configured to execute the instructions to cause the apparatus to send, to interpretation terminals, the first audio stream, and wherein receiving the second audio stream comprises receiving, from one of the interpretation terminals, the second audio stream.

16. The computer program product of claim 14, wherein before sending the first audio stream, the one or more processors are further configured to execute the instructions to cause the apparatus to receive, from the third terminal, the first interpretation capability parameter.

17. The computer program product of claim 14, wherein the one or more processors are further configured to execute the instructions to cause the apparatus to obtain, based on the language identification result that is of the second audio stream and that is from the AI device, the first language.

18. The computer program product of claim 14, wherein the one or more processors are further configured to execute the instructions to cause the apparatus to:
   receive, from the AI device, text corresponding to the second audio stream; and
   obtain, based on the text, the first language.

19. The computer program product of claim 14, wherein before sending the second audio stream, the one or more processors are further configured to execute the instructions to cause the apparatus to:
   store the second audio stream; and
   start, after a media service obtains the first language, to send the second audio stream to the first terminal.

20. The computer program product of claim 14, wherein the one or more processors are further configured to execute the instructions to cause the apparatus to receive, from the first terminal, first language setting information, and wherein the first language setting information indicates the first language.

* * * * *